United States Patent [19]

Kelley

[11] 4,266,743

[45] May 12, 1981

[54] PITCH ATTITUDE STABILIZATION SYSTEM UTILIZING ENGINE PRESSURE RATIO FEEDBACK SIGNALS

[75] Inventor: Wendell W. Kelley, Newport News, Va.

[73] Assignee: The United States of America as represented by the Administrator of the National Aeronautics and Space Administration, Washington, D.C.

[21] Appl. No.: 15,995

[22] Filed: Feb. 28, 1979

[51] Int. Cl.³ .............................................. G05D 1/08
[52] U.S. Cl. .................................... 244/182; 244/181
[58] Field of Search ............................. 244/180–182,
244/186–188, 177, 195, 76 R; 73/178 R;
318/584, 580; 364/433, 434, 435; 60/39.15

[56] References Cited

U.S. PATENT DOCUMENTS

| | | | |
|---|---|---|---|
| 3,160,367 | 12/1964 | Lecarme | 244/76 R |
| 3,691,356 | 9/1972 | Miller | 244/182 X |
| 3,813,063 | 5/1974 | Martin | 244/182 |
| 3,860,800 | 1/1975 | Simpson | 244/181 X |

Primary Examiner—J. D. Miller
Assistant Examiner—Reinhard J. Eisenzopf
Attorney, Agent, or Firm—Howard J. Osborn; John R. Manning; William H. King

[57] ABSTRACT

An aircraft pitch attitude stabilization system that utilizes an engine pressure ratio signal to cancel pitching moments due to changes in engine thrust. The changes in the engine pressure ratio signals which result from thrust changes are used to generate a pitch stabilization signal that is combined with other pitch control signals to automatically counteract pitching moments resulting from the changes in engine thrust.

4 Claims, 3 Drawing Figures

PITCH ATTITUDE STABILIZATION SYSTEM UTILIZING ENGINE PRESSURE RATIO FEEDBACK SIGNALS

ORIGIN OF THE INVENTION

The invention described herein was made by an employee of the National Aeronautics and Space Administration and may be manufactured and used by or for the United States Government for governmental purposes without the payment of any royalties thereon or therefor.

BACKGROUND OF THE INVENTION

This invention relates generally to an aircraft control system and more specifically concerns an aircraft pitch attitude stabilization system that utilizes one or more engine pressure ratio signals to cancel pitching moments due to changes in thrust.

In the unaccelerated trimmed flight of an aircraft, all forces and moments are balanced about the aircraft's center of gravity. In an aircraft in which the engine thrust vector is offset from the center of gravity of the aircraft, the engine thrust contributes to the net pitching moment. In the past the pitching moment due to engine thrust has been counteracted by detecting the motion due to the moment and then generating a pitch control deflection that creates an opposing pitching moment. The disadvantage with these prior art systems is that there is always some unwanted motion due to engine thrust changes.

It is the primary object of this invention to provide means for automatically generating a stabilization signal which causes a pitch control deflection to counteract the pitching moment due to an engine thrust change on an aircraft.

Another object of this invention is to providing a means for anticipating the pitching moment of an aircraft due to engine thrust change and to generate a pitch stabilization signal to counteract the pitching moment before there is any unwanted motion due to engine thrust change.

Other objects and advantages of this invention will become apparent hereinafter and in the drawings.

SUMMARY OF THE INVENTION

This invention is used in an aircraft longitudinal control system in which the pilot's input may be combined with several feedback signals in a predetermined way to form a pitch control signal. This invention includes a means for generating engine pressure ratio (EPR) signals. Henceforth, we will refer to a singular EPR signal although in a multi-engine aircraft this singular signal could be formed by a summation of EPR signals from each engine. Means receives the EPR signal and generates a stabilization signal that will counteract the anticipated pitching moment which accompanies a change in the EPR feedback signal. This stabilization signal may then be combined with other pitch control signals, such as the pilot's input and other feedback signals.

In a first embodiment of the invention the EPR feedback signal is compared with a reference EPR signal to produce an error signal which represents the change in the EPR feedback signal. This error signal is then multiplied by a predetermined constant to produce the pitch stabilization signal.

In a second embodiment of the invention the EPR feedback signal and Mach number and altitude signals are applied to a function generator that generates a signal proportional to thrust. This thrust signal is compared with a reference thrust signal to produce an error signal which is proportional to the change in thrust. This error signal and an airspeed signal are applied to a second function generator which generates the pitch stabilization signal.

DETAILED DESCRIPTION OF THE INVENTION

Figure 1:
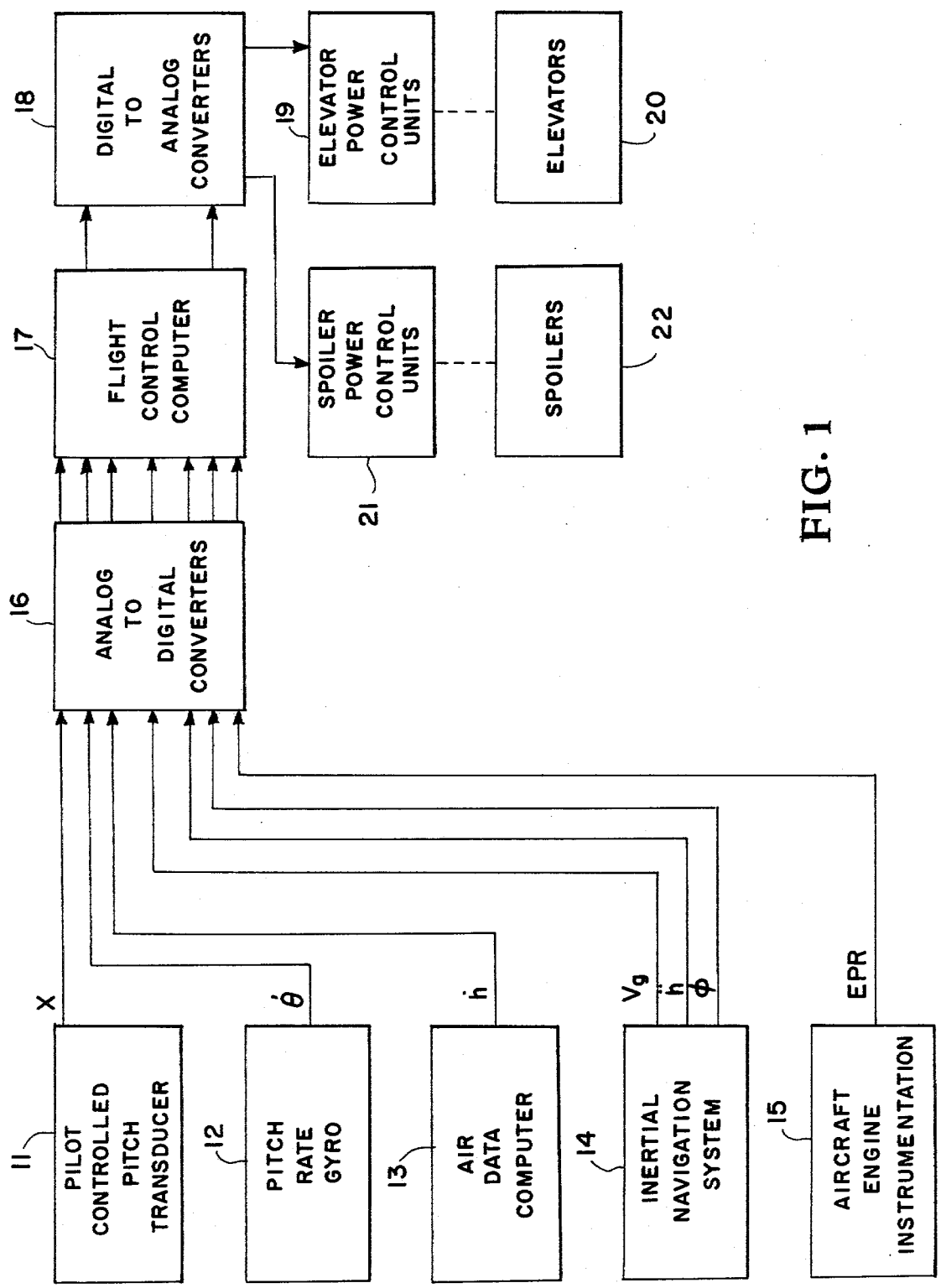
FIG. 1 is a block diagram of an aircraft control system that includes the present invention.

Turning now to the embodiment of the pitch control system selected for illustrating the invention in the drawings the number 11 in FIG. 1 designates a pilot controlled pitch transducer which generates a pitch control signal X. In operating this system the pilot views the flight path angle on the aircraft cockpit display and he changes the value of the pitch control signal X to change the flight path angle to some new commanded value. This system quickens the response time between the time of a change of the pitch control signal X and the time the change is shown on the aircraft display as a change in the flight path angle. Moreover, this system provides a well-damped, highly stable response.

Instrumentation on the aircraft generate feedback control signals: a pitch rate gyro 12 generates a pitch rate signal $\dot{\theta}$; an air data computer 13 generates a vertical velocity signal $\dot{h}$; an aircraft engine instrumentation 15 generates an EPR signal; and an inertial navigation system 14 generates a groundspeed signal $V_g$, a vertical acceleration signal $\ddot{h}$, and a roll angle signal $\phi$. The instrumentation for generating these signals is well known. The aircraft engine instrumentation 15 is widely used as a thrust indication device in the cockpit of jet aircraft. The pitch control, pitch rate, vertical velocity, groundspeed, vertical acceleration, roll angle and EPR signals are all applied to analog-to-digital converters 16 where they are converted to digital signals. These digital signals are applied to a flight control computer 17 which generates an elevator control signal and a spoiler control signal. These elevator control and spoiler control digital signals are applied to digital-to-analog converters 18 which convert them to analog signals. The analog elevator control signal is applied to elevator power control units 19 to control the elevators 20 on the aircraft; and the analog spoiler control signal is applied to spoiler power control units 21 to control the spoilers 22.

Figure 2:
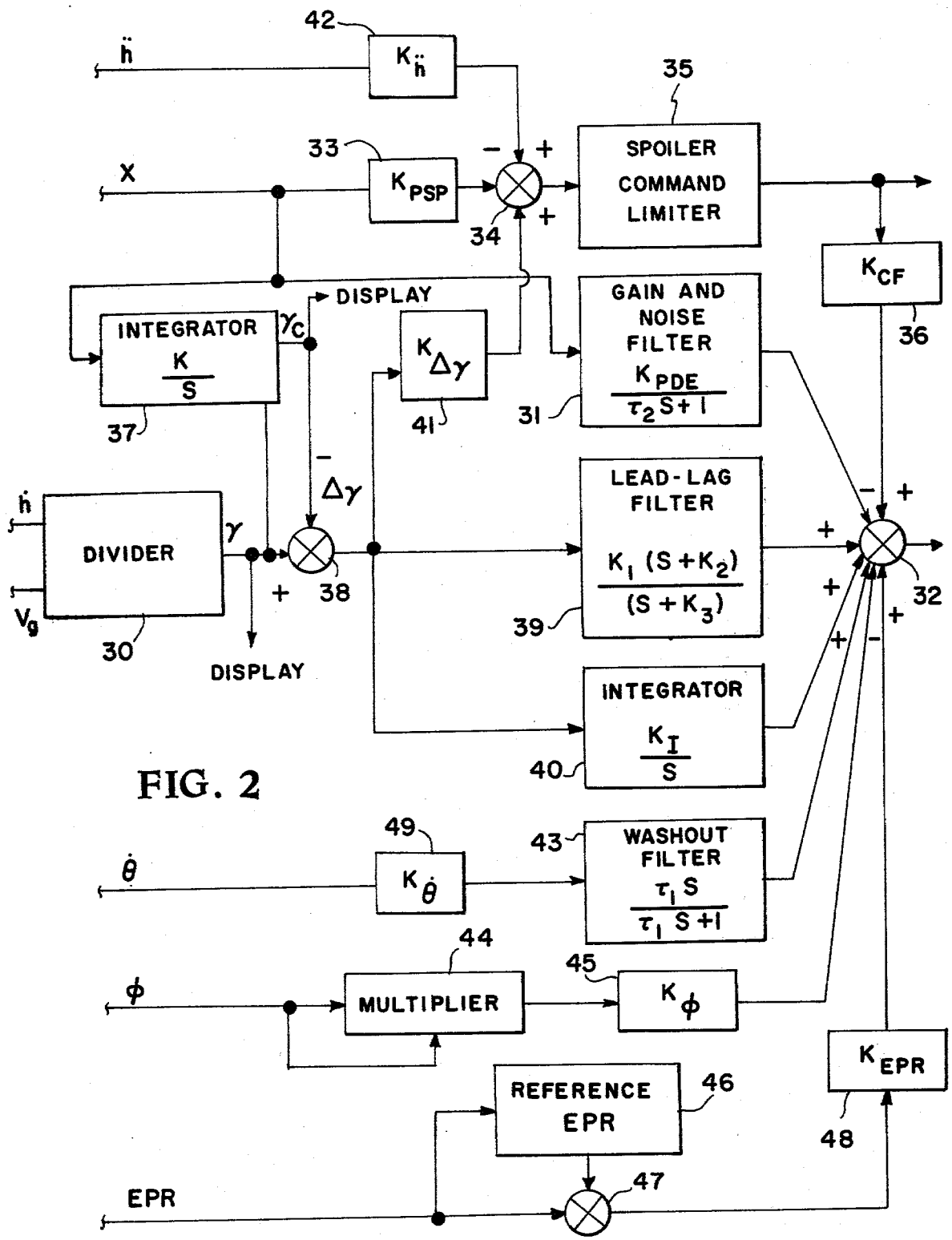
FIG. 2 is a block diagram of the flight control computer shown in FIG. 1 that includes a first embodiment of the invention.

Flight control computer 17 as shown in FIG. 2 includes a divider 30 which receives the vertical velocity and groundspeed signals and generates a flight path angle signal $\gamma$ by dividing the groundspeed signal into the vertical velocity signal. The pitch control signal X from the pilot-controlled transducer 11 is applied through a gain and noise filter 31 to a summing device 32. The output of summing device 32 is the elevator control signal. The signal from the gain and noise filter 31 initiates pitch response through the elevators. The characteristics of the gain and noise filter 31 is defined by the expression:

$$K_{PDE}/\tau_2 s+1$$

where $K_{PDE}$ is a constant determined by the characteristics of the aircraft on which the system is used. $\tau_2$ is a time constant and s is a Laplace operator. The pitch control signal X is also applied to a constant multiplier 33 which multiplies X with a constant $K_{PSP}$. The output multiplier 33 is applied through a summing device 34 to a spoiler command limiter 35 the output of which is the spoiler control signal. The signal at the output of limiter 35 provides an immediate lift increment to start changing the flight path angle in a favorable direction. To counteract the spoiler pitching moment, the spoiler control signal at the output of limiter 35 is cross fed through a constant multiplier 36 which multiplies the signal by a constant $K_{CF}$ to a summing device 32 to provide additional elevator control.

At the instant the system is activated (turned on) by the pilot the flight path angle signal $\gamma$ at the output of divider 31 is applied to an integrator 37 to set the integrator to the initial value of $\gamma$. The pitch control signal X is then integrated by the integrator 37 to form the commanded flight path angle signal $\gamma_c$ at the output of the integrator. This signal is compared with the computed $\lambda$ signal at the output of divider 30 by means of a summing device 38 to produce an error signal $\Delta_\gamma$.

The primary elevator stabilization signal is derived by passing the error signal $\Delta_\gamma$ through a high gain lead-lag filter 39 the output of which is applied to summing device 32. The characteristic of filter 39 is defined by the expression:

$$K_1(s+K_2)/s+K_3$$

where $K_1$, $K_2$ and $K_3$ are constants. This part of the elevator control signal is the primary elevator stabilization signal. Filter 39 is the part of the system that optimizes stability and response. The $\Delta_{65}$ signal is also applied through an integrator 40 the output of which is applied to the summing device 32. This part of the elevator control signal takes care of possible steady-state standoff errors which would occur due to bias error signals or elevator trim requirements. In addition the signal $\Delta_\gamma$ is applied through a constant multiplier 41, which multiplies the signal by a constant $K_{\Delta\gamma}$, to summing device 34 to provide long term spoiler corrections for the flight path angle errors. The vertical acceleration signal $\ddot{h}$ from the inertial navigation system 14 is applied through a constant multiplier 42, which multiplies the signal by a constant $k_{\ddot{h}}$, to the summing device 34. This part of the spoiler control signal essentially provides a $\dot{\gamma}$ signal for stabilization.

The pitch rate signal $\dot{\theta}$ from the pitch rate gyro 12 is applied through a constant multiplier 49, which multiplies the signal by a constant $K_{\dot{\theta}}$, to a washout filter 43. The characteristic of filter 43 is defined by the expression:

$$\tau_1 s/\tau_1 s+1$$

where $\tau_1$ is a time constant. The output of filter 43 is applied to summing device 32 to provide short period mode dampening in the elevator control signal. The roll angle signal $\phi$ from the inertial navigation system 14 is squared by a multiplier 44 and applied through a constant multiplier 45 to the summing device 32. Multiplier 45 multiplies the roll angle signal by a constant $K_\phi$ to cancel a loss of the vertical component of lift due to bank angles.

In a first embodiment of the invention the EPR feedback signal is used to cancel pitching moments due to thrust changes. Design of the feedback system is based upon knowledge of the relationship between engine location, engine thrust, EPR, and elevator effectiveness. An analysis of these factors produces a gain $K_{EPR}$ which when applied to the EPR feedback signal commands the proper amount of elevator to cancel thrust induced pitching moments. To implement this part of the pitch control signal the EPR signal initially sets the reference EPR 46 at the time the pilot engages the system. Thereafter the generated EPR signal is compared with the reference EPR signal by means of a summing device 47. The difference output of summing device 47 is multiplied by a constant $K_{EPR}$ by means of a constant multiplier 48 and then applied to summing device 32. Two benefits are immediately available from this scheme: pitch disturbances due to thrust changes are cancelled, and an elevator bias signal is provided downstream of the washout integrator 40 allowing a reduction in the integrator gain and thereby contributing to an increase in system stability.

Figure 3:
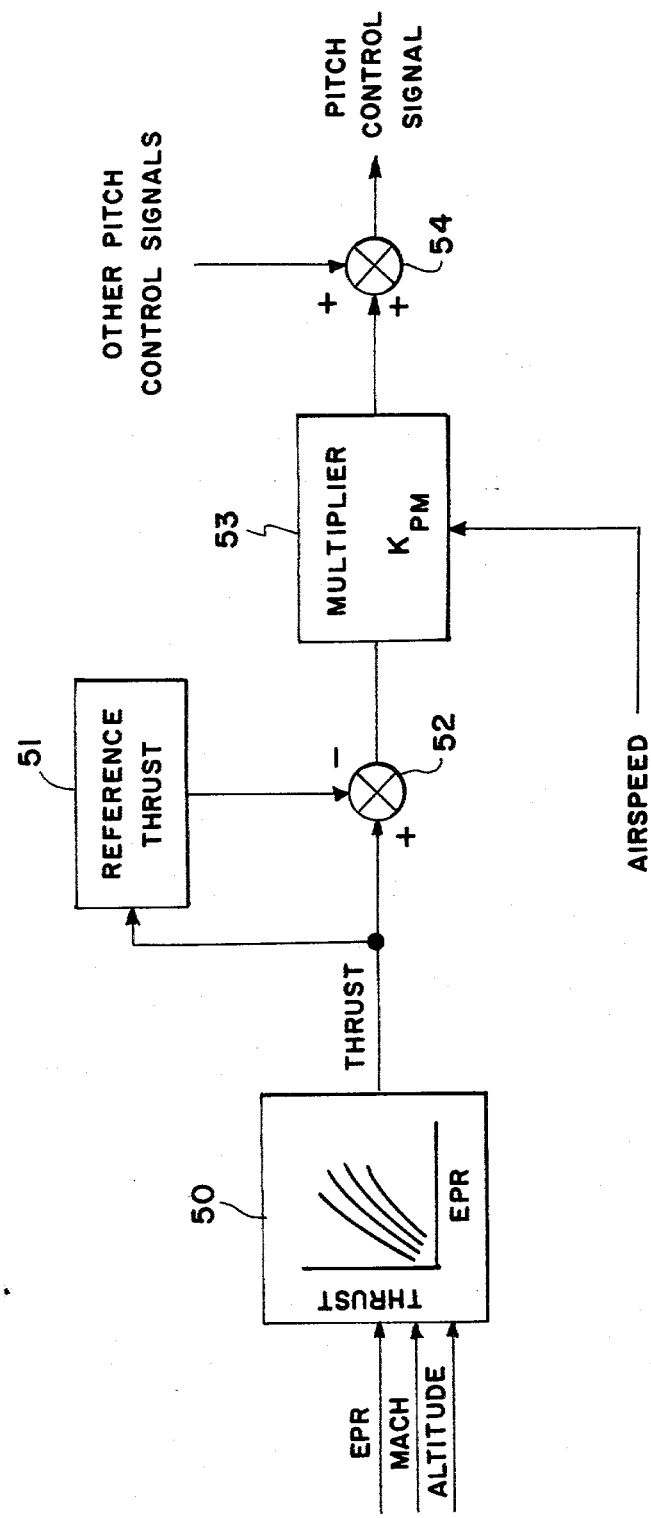
FIG. 3 is a block diagram of the second embodiment of the invention.

In a second embodiment of the invention shown in FIG. 3, the EPR feedback signal along with a Mach number signal and an altitude signal are applied to a function generator 50 which generates a signal proportional to thrust. Characteristics of the function generator 50 are determined by the particular engine or engines used on a particular aircraft. The thrust-EPR relationship varies with altitude and Mach number, so that the total relationship is a family of curves like that shown on function generator 50. For any combination of EPR, Mach number and altitude signals there is only one thrust signal which is generated at the output of function generator 50. This thrust signal initially sets the reference thrust 51 at the time the pilot engages the system. Thereafter this generated thrust signal is compared with the reference thrust signal by means of a summing device 52. The difference output of summing device 52 is multiplied by a value $K_{PM}$ by means of a multiplier 53. The magnitude of $K_{PM}$ is dictated by engine thrust vector offset, pitch control device effectiveness and airspeed and will be affected by characteristics of the particular aircraft. The sign of $K_{PM}$ is determined by the location of the engines (above or below the center of gravity) and the sign conventions employed by the pitch control system. Since the magnitude of $K_{PM}$ is dependent on the airspeed (a variable), multiplier 53 is in effect a function generator that receives the thrust difference signal and an airspeed signal and generates a pitch stabilization signal. The stabilization signal at the output of multiplier 53 is combined with the other pitch control signals by means of a summing device 54 to form the total pitch control signal.

The first embodiment of the invention shown in FIG. 2 can be used with good results when the engine thrust setting does not vary too far from an equilibrium operating point. However, if a more exact relationship is needed, the second embodiment of the invention shown in FIG. 3 should be used for best results.

All of the constants shown in the block diagram in FIG. 2 are determined by the particular aircraft on which the invention is used. A good estimate of each constant can be determined from the available data on the aircraft and thereafter the constants can be adjusted to obtain the desired responses.

This control system in FIG. 2 has been used on a flight simulator by Langley Research Center in Hampton, Virginia. The simulator represents a twin-engine medium jet transport that was modified to include an advanced research cockpit, direct lift control capability, and onboard flight research equipment. The values of the constants in FIG. 2 that were used are as follows:

$K_h = 4.9$
$K_{PSP} = 2.4$
Limiter $35 = \pm 8°$
$K_{cf} = 0.35$
$K_c = 0.33$
$K_{\Delta\gamma} = 8.0$
$K_{PDE} = 1.3$
$\tau_2 = 0.09$
$K_1 = 20.0$
$K_2 = 0.8$
$K_3 = 2.5$
$K_I = 0.3$
$K_{\dot\theta} = 4.0$
$\tau_1 = 16$
$K_\phi = 0.004$
$K_{EPR} = 8.2$ Even though this invention has been disclosed with a particular pitch control system, it should be understood that it can be used with other pitch control systems without departing from the invention.

The advantage of this invention over other pitch stabilization systems is that it anticipates the pitching moments due to engine thrust changes and corrects for them before they happen.

What is claimed is:

1. In an aircraft pitch control system in which several signals are summed by a summing means to form a pitch control signal that is used to control the aircraft about its pitch axis, means for including with said pitch control signal a pitch stabilization signal that will counteract the anticipated pitching moment caused by changes in the engine pressure ratio consisting of means for generating an engine pressure ratio signal, means for establishing a reference engine pressure ratio signal, means receiving said engine pressure ratio signal and said reference engine pressure ratio signal for producing a signal proportional to the difference of the two signals, means for multiplying said difference signal by a predetermined constant to produce said pitch stabilization signal and means for applying said pitch stabilization signal to said summing means.

2. In an aircraft pitch control system in which several signals are summed by a summing means to form a pitch control signal that is utilized to control the aircraft about its pitch axis, means for including with said pitch control signal a pitch stabilization signal that will counteract the anticipated pitching moment caused by changes in engine thrust comprising means for generating an engine pressure ratio signal, means receiving said engine pressure ratio signal for generating a signal proportional to the changes in engine thrust, means receiving said signal proportional to the changes in engine thrust for generating said pitch stabilization signal and means for applying said pitch stabilization signal to said summing means.

3. In an aircraft pitch control system according to claim 2 wherein said means for generating a signal proportional to the changes in engine thrust includes a function generator means receiving said engine pressure ratio signal and Mach number and altitude signals for generating a signal proportional to thrust, means for establishing a reference thrust signal and means receiving said signal proportional to thrust and said reference thrust signal for generating a signal proportional to the difference of the two signals whereby said difference signal is said signal proportional to the changes in engine thrust.

4. In an aircraft pitch control system according to claim 3 wherein said means for generating a pitch stabilization signal consists of means for multiplying said difference signal by a signal proportional to airspeed.

* * * * *